(12) United States Patent
Yadomaru

(10) Patent No.: US 12,071,051 B2
(45) Date of Patent: Aug. 27, 2024

(54) VEHICLE SEAT

(71) Applicant: SUBARU CORPORATION, Tokyo (JP)

(72) Inventor: Yusuke Yadomaru, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 215 days.

(21) Appl. No.: 17/687,168

(22) Filed: Mar. 4, 2022

(65) Prior Publication Data
US 2022/0305970 A1   Sep. 29, 2022

(30) Foreign Application Priority Data
Mar. 26, 2021  (JP) ................. 2021-053481

(51) Int. Cl.
| | | |
|---|---|---|
| B60N 2/427 | (2006.01) | |
| B60N 2/42 | (2006.01) | |
| B60N 2/50 | (2006.01) | |
| B60R 21/0134 | (2006.01) | |
| B60R 21/0136 | (2006.01) | |
| B60R 22/195 | (2006.01) | |
| B60R 21/00 | (2006.01) | |
| B60R 21/01 | (2006.01) | |
| B60R 22/18 | (2006.01) | |

(52) U.S. Cl.
CPC ....... *B60N 2/42763* (2013.01); *B60N 2/4228* (2013.01); *B60N 2/427* (2013.01); *B60N 2/42781* (2013.01); *B60N 2/4279* (2013.01); *B60N 2/501* (2013.01); *B60R 21/0134* (2013.01); *B60R 21/0136* (2013.01); *B60R 22/195* (2013.01); *B60R 2021/0011* (2013.01); *B60R 2021/01027* (2013.01); *B60R 2022/1825* (2013.01)

(58) Field of Classification Search
None
See application file for complete search history.

(56) References Cited

U.S. PATENT DOCUMENTS

| | | | | |
|---|---|---|---|---|
| 3,848,914 A | * | 11/1974 | Wathen | B60R 19/40 307/106 |
| 5,449,214 A | * | 9/1995 | Totani | B60N 2/4221 296/68.1 |
| 5,490,706 A | * | 2/1996 | Totani | B60N 2/4221 296/68.1 |
| 11,377,066 B1 | * | 7/2022 | Llamazares Domper | B60R 22/341 |

(Continued)

FOREIGN PATENT DOCUMENTS

| | | | | |
|---|---|---|---|---|
| DE | 10120849 A1 | * | 10/2002 | ........... B60N 2/4221 |
| FR | 2814408 A1 | * | 3/2002 | ......... B60N 2/42718 |

(Continued)

*Primary Examiner* — David E Allred
(74) *Attorney, Agent, or Firm* — MCGINN I.P. LAW GROUP, PLLC

(57) ABSTRACT

A vehicle seat to be mounted on a vehicle includes a seat cushion and a seat surface lowering mechanism. The seat cushion includes a seat surface on which a waist of an occupant of the vehicle is to be placed. The seat surface lowering mechanism is configured to lower the seat surface in response to either one of an occurrence of a rear-end collision of the vehicle or a sign of the occurrence of the rear-end collision.

5 Claims, 11 Drawing Sheets

(56) References Cited

U.S. PATENT DOCUMENTS

| | | | |
|---|---|---|---|
| 2006/0006719 A1* | 1/2006 | Friedman | B60N 2/4279 297/377 |
| 2006/0196715 A1* | 9/2006 | Fujishiro | B60N 2/42736 180/274 |
| 2007/0290535 A1* | 12/2007 | Meredith | B60R 22/1955 297/480 |
| 2010/0176628 A1* | 7/2010 | Pywell | B60N 2/42736 297/216.1 |
| 2011/0121621 A1* | 5/2011 | Masutani | B60N 2/4221 297/216.1 |
| 2013/0154328 A1* | 6/2013 | Maeda | B60N 2/0244 297/311 |
| 2014/0358378 A1* | 12/2014 | Howard | F16F 15/00 701/45 |
| 2015/0239373 A1* | 8/2015 | Weng | B60N 2/42754 297/216.1 |
| 2016/0207427 A1* | 7/2016 | Wang | B60N 2/42709 |
| 2018/0022244 A1* | 1/2018 | Duncan | B60N 2/42736 297/216.17 |
| 2019/0184867 A1* | 6/2019 | Ketels | B60N 2/525 |
| 2023/0286426 A1* | 9/2023 | Viano | B60N 2/4279 297/216.15 |

FOREIGN PATENT DOCUMENTS

| | | |
|---|---|---|
| JP | 08258604 A * | 10/1996 |
| JP | 2977000 B2 * | 11/1999 |
| JP | 2005205939 A * | 8/2005 |
| JP | 2005306112 A * | 11/2005 |
| JP | 2007-167110 A | 7/2007 |
| JP | 4320594 B2 * | 8/2009 |
| JP | 2010-254054 A | 11/2010 |
| JP | 2013-099975 A | 5/2013 |
| KR | 20030095879 A * | 12/2003 |

* cited by examiner

← VEHICLE FORWARD DIRECTION    ↕ VEHICLE WIDTH DIRECTION

VEHICLE SEAT

CROSS-REFERENCE TO RELATED APPLICATIONS

The present application claims priority from Japanese Patent Application No. 2021-053481 filed on Mar. 26, 2021, the entire contents of which are hereby incorporated by reference.

BACKGROUND

The disclosure relates to a vehicle seat provided in a vehicle such as an automobile.

It is demanded to reduce an injury (typically, so-called whiplash injury) of an occupant, for example, when a vehicle such as an automobile is collided from a rear end thereof (that is, a rear-end collision).

As a related art relating to improvement of occupant protection performance against a rear-end collision, for example, Japanese Unexamined Patent Application Publication (JP-A) No. 2013-099975 describes that, in order to appropriately absorb an impact during a rear-end collision and reduce a movement amount that a headrest moves rearward, a seat back (a backrest) is moved in a pendulum manner by a rearward load of an occupant to move the headrest forward while absorbing energy.

JP-A No. 2010-254054 describes that, in order to absorb an impact during a rear-end collision, an impact absorber that is elastically deformed due to the impact is provided in a reclining mechanism provided between a seat cushion and a seat back, and the impact is absorbed when the seat back rotates rearward.

As another related art relating to a vehicle seat, for example, JP-A No. 2007-167110 describes a technique in which, in order to achieve both occupant holding performance and ease of egress and ingress, a side support provided on a side of a seat cushion can be pressed by winding a wound cloth material surrounding the side support by a winding device.

SUMMARY

An aspect of the disclosure provides a vehicle seat to be mounted on a vehicle. The vehicle seat includes a seat cushion and a seat surface lowering mechanism. The seat cushion includes a seat surface on which a waist of an occupant of the vehicle is to be placed. The seat surface lowering mechanism is configured to lower the seat surface in response to either one of an occurrence of a rear-end collision of the vehicle or a sign of the occurrence of the rear-end collision.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A whiplash injury during a rear-end collision is worsened if a neck and a head does not follow a behavior of an upper body and thus receive a strong force.

To address this issue, for example, for a front seat, a headrest may be moved forward relatively to an occupant by causing the upper body of the occupant to deeply sink into the seat back, so that the neck and the head are easily received by the headrest. However, for example, in a rear seat of a three-box vehicle having a rigid partition wall between a vehicle cabin and a luggage room, it is difficult to provide a space having a sufficient length to allow the occupant to sink into the seat back.

It is desirable to provide a vehicle seat that reduces an occupant injury during a rear-end collision.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Hereinafter, a vehicle seat according to a first embodiment of the disclosure will be described.

The vehicle seat according to the first embodiment is provided, for example, at a rear seat of an automobile such as a passenger vehicle having two rows of front and rear seats.

Figure 1:
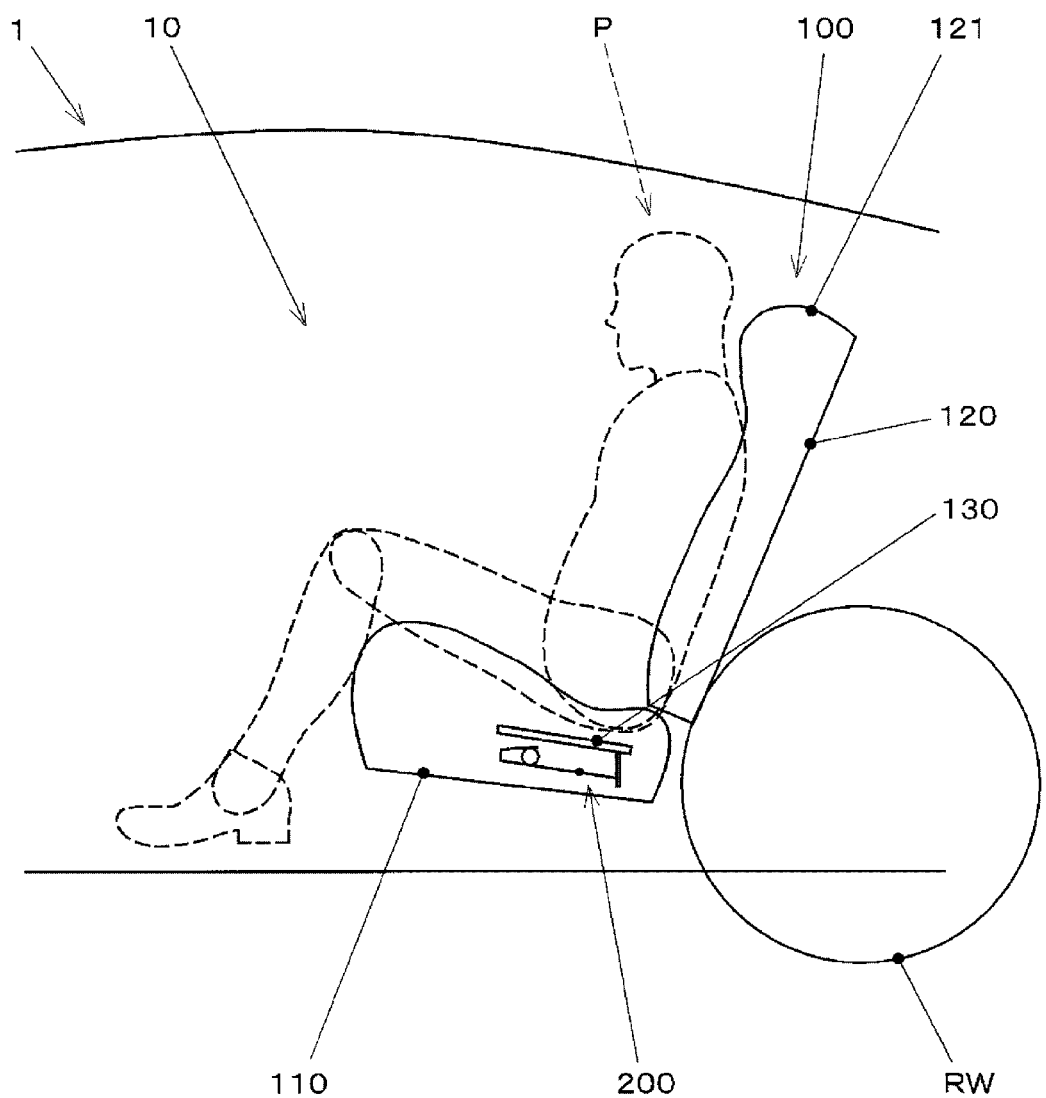
FIG. 1 is a view illustrating a configuration of a vehicle body rear portion of a vehicle having a vehicle seat according to an embodiment of the disclosure, before a collision.

FIG. 1 is a view illustrating a configuration of a vehicle body rear portion of a vehicle having the vehicle seat according to the first embodiment, before a collision.

FIG. 1 illustrates a side view of the vehicle body as viewed in a vehicle width direction (the same applies to FIGS. 4 and 6 to 11).

Figure 2:
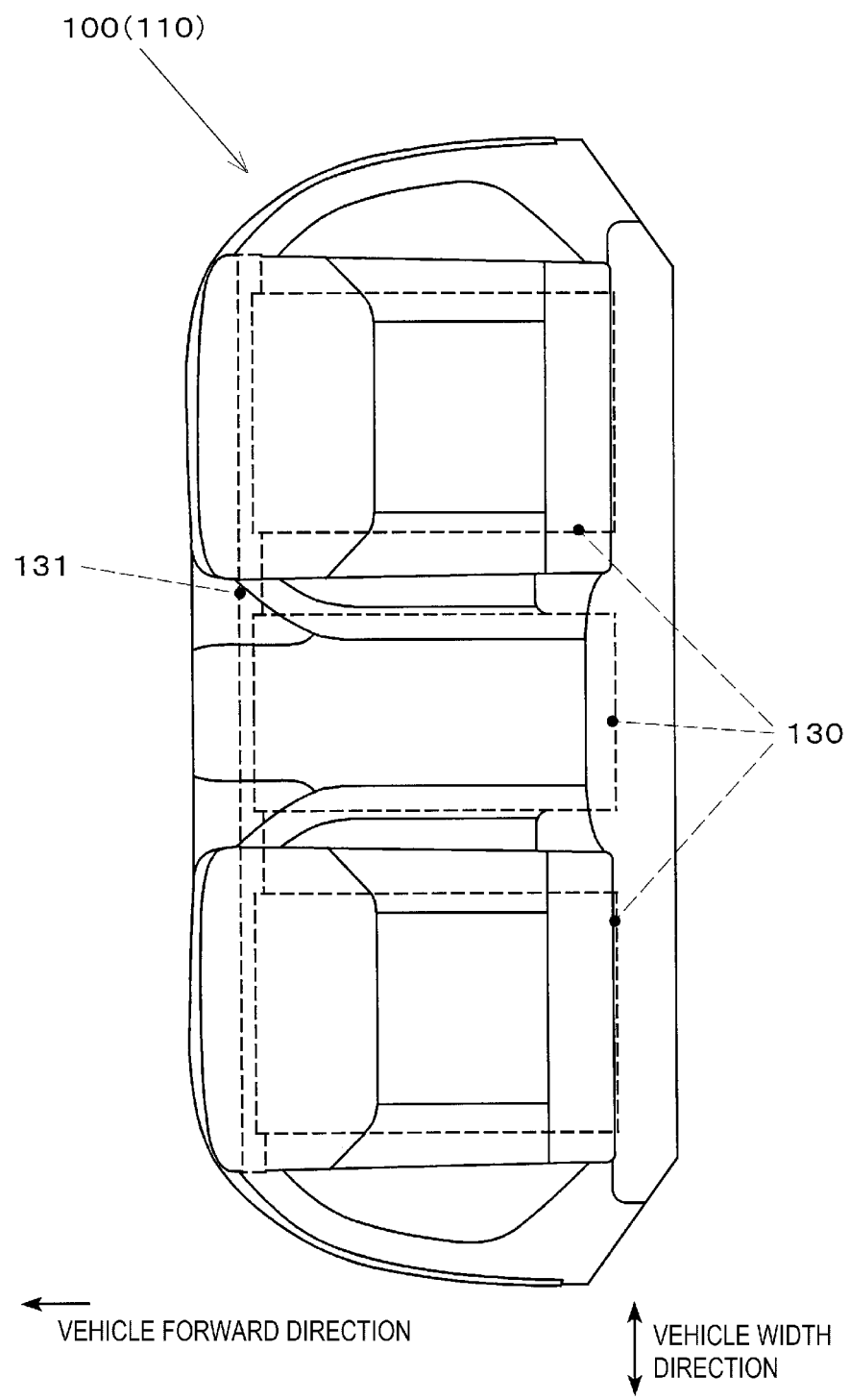
FIG. 2 is a plan view of a seat cushion of the vehicle seat according to the first embodiment, as viewed from above.

FIG. 2 is a plan view of a seat cushion of the vehicle seat according to the first embodiment, as viewed from above.

A vehicle 1 includes a vehicle cabin 10 that is a space for accommodating an occupant.

A rear portion of the vehicle cabin 10 is adjacent to a rear wheel RW.

The vehicle 1 includes, for example, front seats and rear seats that are arranged in two rows in a front-rear direction.

A vehicle seat (hereinafter, simply referred to as a "seat") 100 according to the first embodiment is provided for a rear seat, and is disposed in the rear portion of the vehicle cabin 10.

The seat 100 includes a seat cushion 110, a seat back 120, seat pans 130, a seat surface lowering mechanism 200, and the like.

The seat cushion 110 includes a seat surface on which a waist (a pelvis) and thighs of the occupant is to be placed.

The overall outline of the seat cushion 110 has a panel shape extending in the vehicle front-rear direction and the vehicle width direction.

The seat cushion 110 is formed of an elastic porous material such as urethane foam.

A frame body such as a seat frame, a core material made of a metal wire material, and the like are disposed inside the seat cushion 110 in order to maintain a shape of the seat cushion 110 and the like. The seat cushion 110 is covered with a fabric such as a woven fabric or a knitted fabric, or a skin such as leather.

The seat back 120 protrudes upward from the vicinity of a rear end of the seat cushion 110, and mainly holds a back of the occupant.

The seat back 120 is formed of an elastic porous material similar to the seat cushion 110, and is covered with a skin.

A back surface (rear surface) of the seat back 120 constitutes, for example, a part of a vehicle body structural member, and is held by a partition wall (bulkhead) that partitions the vehicle cabin and a luggage space.

The seat back 120 is inclined rearward such that an upper end of the seat back 120 is located on a vehicle rear side of a lower end of the seat back 120.

The upper end of the seat back 120 is provided with a headrest 121 that receives a head of an occupant P during a rear-end collision or the like.

The seat pan 130 is a member that is provided inside the seat cushion 110 and loaded with a load transmitted from the waist of the occupant.

The seat pan 130 has a flat plate shape and is formed of a harder material (such as a metal plate) than the material of the seat cushion 110.

As illustrated in FIG. 1, the seat pan 130 is adjacent to an upper surface, which constitutes the seat surface, of the seat cushion 110 and is substantially parallel to the upper surface.

As illustrated in FIG. 2, the seat pan 130 is disposed below the waist of the occupant in the plan view of the seat cushion 110.

For example, in the first embodiment, three persons can be seated on the seat 100 in the vehicle width direction, and three seat pans 130 are provided in a dispersed manner in the vehicle width direction.

A shaft 131 that couples the plurality of seat pans 130 is disposed at front ends of the plurality of seat pans 130.

The shaft 131 is a columnar shaped member disposed along the vehicle width direction.

The front ends of the seat pans 130 are fixed to the shaft 131 by, for example, welding or the like.

When support of the seat pans 130 is disabled by the seat surface lowering mechanism 200, the shaft 131 supports the seat pans 130 to be swingable (rotatable) in a direction in which rear ends of the seat pans 130 are lowered.

The seat surface lowering mechanism 200 is a mechanism that disables a member that supports rear portions of the seat pans 130 in an up-down direction to lower (drop) the seat pans 130 and lower (drop) the seat surface of the seat cushion 110, when the vehicle 1 is subjected to a rear-end collision.

Figure 3A:
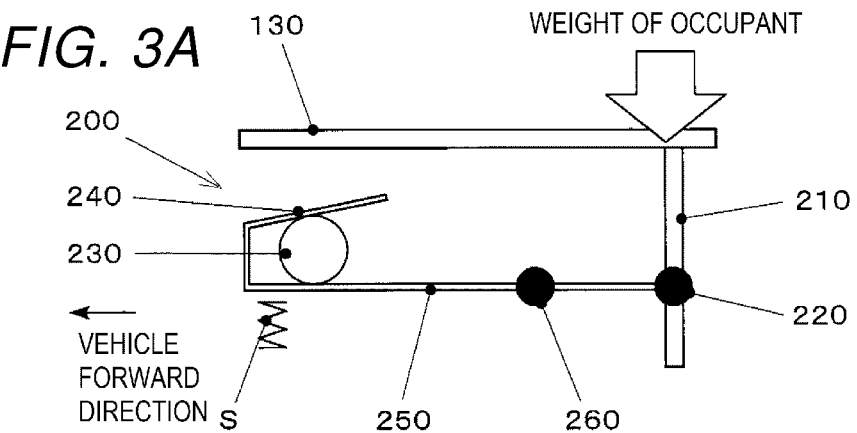
FIGS. 3A to 3C are views schematically illustrating a configuration and operation of a seat surface lowering mechanism provided in the vehicle seat according to the embodiment.
Figure 3B:
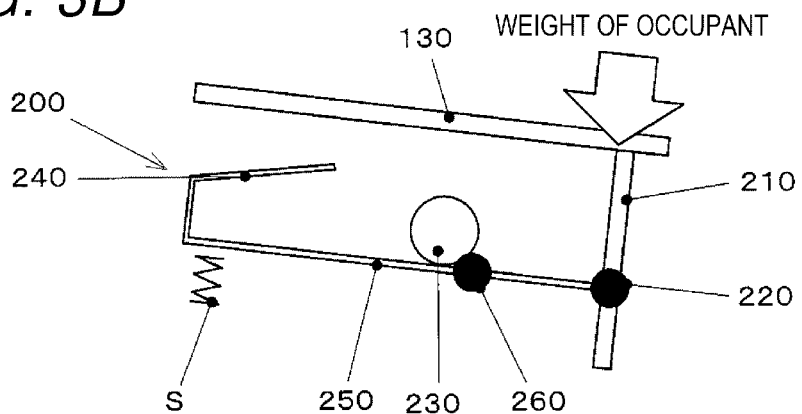
Figure 3C:
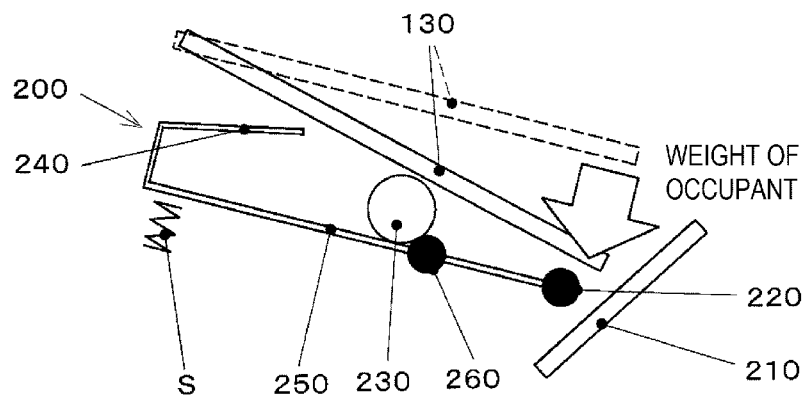

FIGS. 3A to 3C are views schematically illustrating a configuration and operation of the seat surface lowering mechanism provided in the vehicle seat according to the first embodiment.

The seat surface lowering mechanism 200 includes a support 210, a lock mechanism 220, a ball 230, a ball holder 240, a ball traveling member 250, an unlock trigger 260, and the like.

The support 210 is a pillar-shaped member that supports the rear portion of the seat pan 130.

An upper end of the support 210 supports the rear portion of the seat pan 130 from below.

A lower end of the support 210 is locked to a hard member such as a frame in the seat cushion 110.

The lock mechanism 220 is provided, for example, in an intermediate portion of the support 210, and transitions between (i) a locked state where the support 210 is restrained with supporting the seat pan 130 and (ii) an unlocked state where the support of the seat pan 130 by the support 210 is disabled.

In one embodiment, the lock mechanism 220 may serve as a "support disabling unit".

The ball 230 is normally held by the ball holder 240. When an acceleration due to, for example, a rear-end collision or the like acts on the vehicle body, the ball 230 is guided by the ball traveling member 250 to travel (roll) toward the vehicle rear side, and activates the unlock trigger 260.

The ball 230 is, for example, a rolling element such as a steel ball.

The ball holder 240 is a member that holds the ball 230 in a normal state (before a collision).

The ball holder 240 is disposed on a front side of the lock mechanism 220 and the unlock trigger 260, and holds the ball 230 by sandwiching the ball 230 from above and below.

A holding force of the ball 230 by the ball holder 240 is set such that the ball 230 falls off when an acceleration equal to or higher than a predetermined value acts on the vehicle body.

The ball traveling member 250 is a track-shaped member on which the ball 230 that has fallen off from the ball holder 240 during a rear-end collision is guided to roll and travel.

The ball traveling member 250 extends from the ball holder 240 toward the vehicle rear side.

The lock mechanism 220 is provided at a rear end of the ball traveling member 250.

A front portion of the ball traveling member 250 is supported via a spring S to be displaceable in the up-down direction with respect to the seat frame (not illustrated).

The unlock trigger 260 is provided in an intermediate portion of the ball traveling member 250. The unlock trigger 260 allows the lock mechanism 220 to transition from the locked state to the unlocked state when colliding with the ball 230 with a strength equal to or greater than a predetermined strength.

FIG. 3A illustrates a normal traveling state (initial state) of the vehicle.

In this state, the ball 230 is held by the ball holder 240, and the lock mechanism 220 is in the locked state.

At this time, the support 210 supports the seat pan 130 and can support the weight of the occupant.

FIG. 3B illustrates a state where a lower acceleration than that during a rear-end collision is generated due to, for example, a sudden acceleration of the vehicle 1 (an inclination in FIG. 3B indicates a magnitude of the acceleration. The same applies to FIG. 3C).

In this state, the ball 230 falls off from the ball holder 240, rolls toward the vehicle rear side along the ball traveling member 250, and collides with the unlock trigger 260.

However, when an impact (acceleration) during a collision of the ball 230 with the unlock trigger 260 is less than a preset threshold value, the unlock trigger 260 is not activated, and the lock mechanism 220 is maintained in the locked state.

FIG. 3C illustrates a state where the vehicle 1 is subjected to a rear-end collision and a higher acceleration than that in the state illustrated in FIG. 3B is generated.

In this state, the ball 230 falls off from the ball holder 240, rolls toward the vehicle rear side along the ball traveling member 250, and collides with the unlock trigger 260.

At this time, when the impact (acceleration) during a collision of the ball 230 with the unlock trigger 260 is equal to or greater than the preset threshold value, the unlock trigger 260 is activated to cause the lock mechanism 220 to transition from the locked state to the unlocked state.

As a result, the support 210 falls off from a lower portion of the seat pan 130 and is disabled, and the rear portion of the seat pan 130 is lowered together with the seat surface due to the weight of the occupant P.

Figure 4:
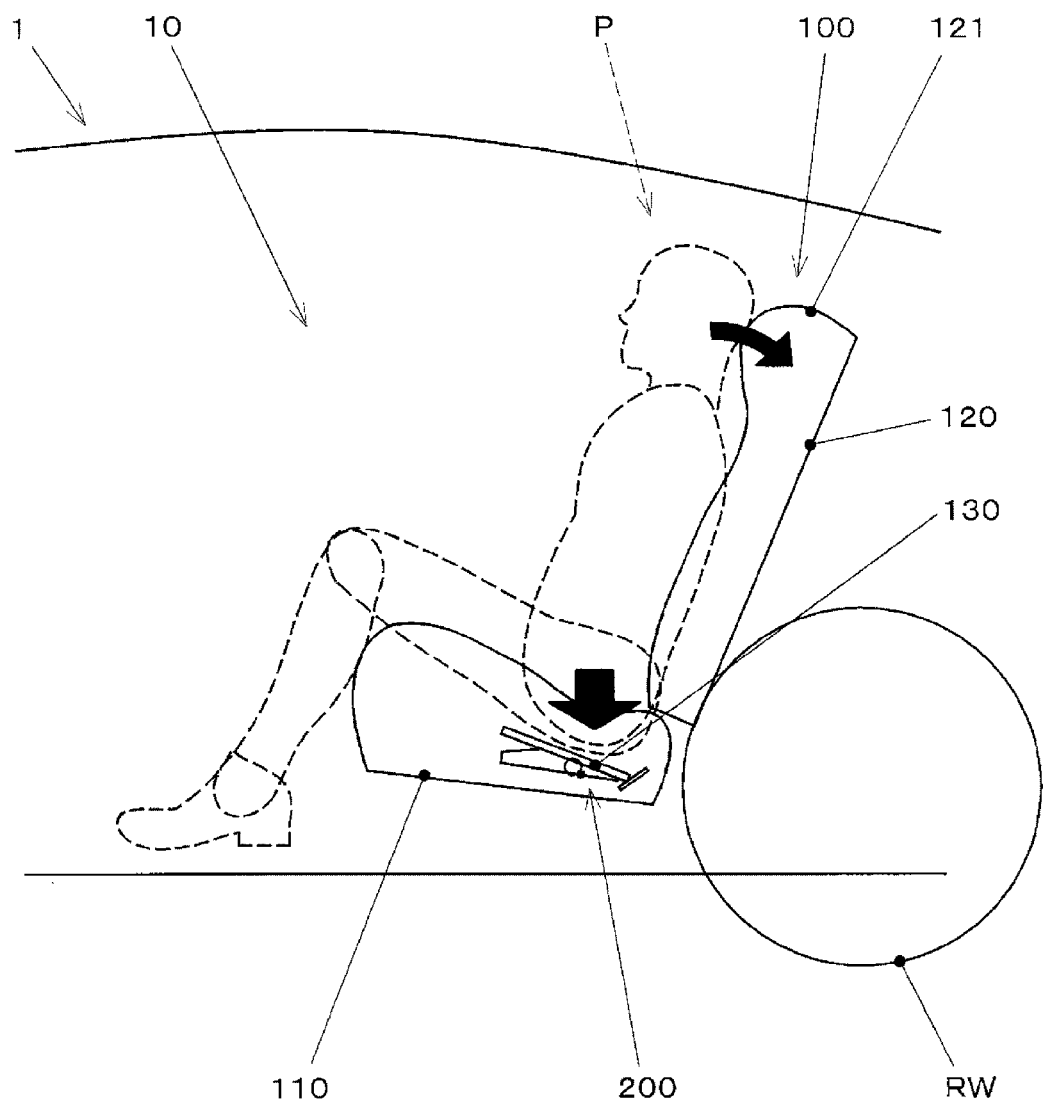
FIG. 4 is a view illustrating the configuration of the vehicle body rear portion of the vehicle according to the embodiment, after a rear-end collision.

FIG. 4 is a view illustrating the configuration of the vehicle body rear portion of the vehicle according to the first embodiment, after the rear-end collision.

As illustrated in FIG. 4, in response to the occurrence of the rear-end collision, the seat pan 130 and the seat surface above the seat pan 130 are lowered, so that the waist of the occupant P is lowered to sink into the seat cushion 110.

As a result, the occupant P is prevented from sliding up on the seat back 120, and when the head of the occupant P is swung toward the vehicle rear side due to the acceleration, the head of the occupant P is appropriately received by the headrest 121 provided at the upper end of the seat back 120, and so-called whiplash injury can be reduced.

As described above, according to the first embodiment, the following effects can be obtained.

(1) The seat surface of the seat cushion 110 is lowered in response to an occurrence of a rear-end collision. Therefore, the waist (including the pelvis) of the occupant P is sunk into the seat cushion 110 to absorb the impact acting on the occupant P due to the rear-end collision, the upper body of the occupant P is prevented from rising along an inclined surface of the seat back 120, and the head of the occupant P can be appropriately received by the headrest 121, so that so-called whiplash injury can be reduced.

(2) The support 210 is disabled in response to the acceleration acting on the ball 230, so that the above effects can be simply and inexpensively obtained by a mechanical configuration that does not use electrical control.

Second Embodiment

Next, a vehicle seat according to a second embodiment of the disclosure will be described.

In embodiments described below, the same reference numerals will be given to the same elements as those of the first embodiment described above, the description thereof will be omitted, and differences from the first embodiment will be mainly described.

In the second embodiment, the support 210 is disabled to lower the seat pan 130 using a drive device such as an electric actuator, instead of the seat surface lowering mechanism 200 sensitive to a front-rear acceleration in the first embodiment.

Figure 5:
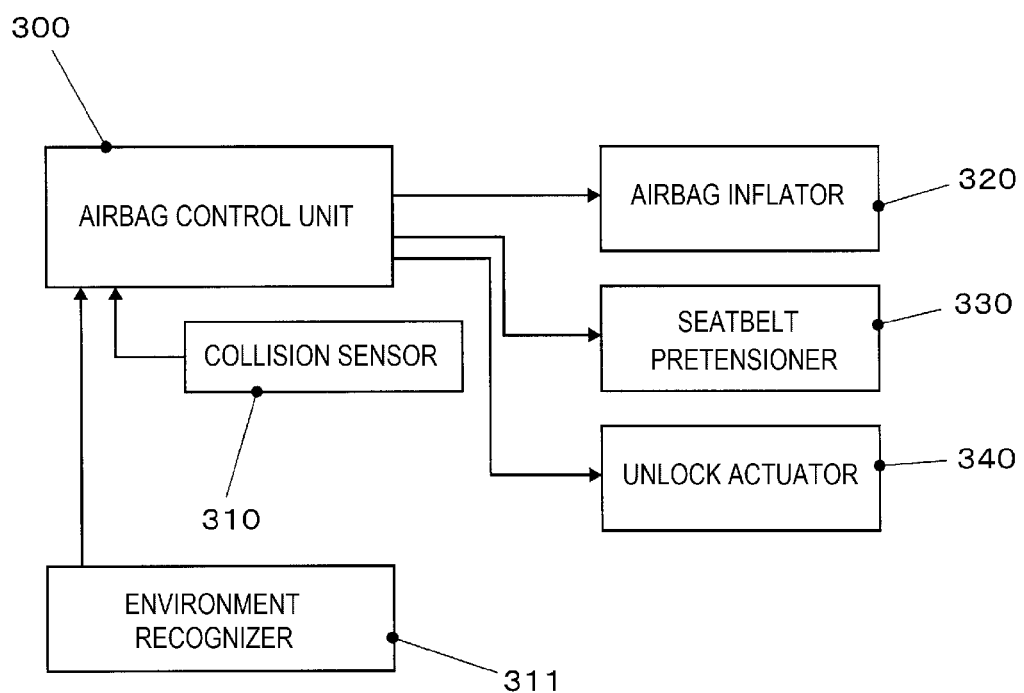
FIG. 5 is a block diagram illustrating a configuration of a collision damage reduction system of a vehicle having a vehicle seat according to an embodiment of the disclosure.

FIG. 5 is a block diagram illustrating a configuration of a vehicle collision damage reduction system of a vehicle having the vehicle seat according to the second embodiment.

The collision damage reduction system controls an airbag and a seat surface lowering mechanism of the rear seat.

The collision damage reduction system includes an airbag control unit 300, a collision sensor 310, an environment recognizer 311, an airbag inflator 320, a seatbelt pretensioner 330, and an unlock actuator 340.

The airbag control unit 300 outputs a signal for activating the airbag inflator 320, the seatbelt pretensioner 330, and the unlock actuator 340 in accordance with outputs of the collision sensor 310 and the environment recognizer 311.

The airbag control unit 300 and the environment recognizer 311 may be implemented by a microcomputer including, for example, an information processor such as a CPU, a storage unit such as a RAM and a ROM, an input/output interface, and a bus connecting these components.

The collision sensor 310 includes acceleration sensors provided in respective portions of the vehicle body, and detects a significant acceleration (impact) caused by a collision between a host vehicle and an object such as another vehicle.

The environment recognizer 311 recognizes an obstacle such as another vehicle present around the host vehicle using various sensors such as a camera, a millimeter-wave radar, and a three-dimensional laser scanner (LIDAR).

The environment recognizer 311 has a function of recognizing a relative position and a relative speed of the other vehicle (a following vehicle) following behind the host vehicle with respect to the host vehicle, and determining a possibility of a collision (a rear-end collision) of the following vehicle with the host vehicle.

In one embodiment, the collision sensor 310 and the environment recognizer 311 may serve as a "rear-end collision detector".

The airbag inflator 320 includes, for example, a chemical gas generator, and blows a deployment gas into an airbag (not illustrated) housed in an interior member in a folded state before a collision, to deploy and inflate the airbag.

The seatbelt pretensioner 330 includes a bobbin driven by, for example, a chemical actuator, and applies a tension by winding up a seatbelt B (not illustrated) during a collision of the vehicle.

The unlock actuator 340 is an electric actuator, such as an electromagnetic solenoid, that causes the lock mechanism 220, which restrains the support 210 supporting the rear portion of the seat pan 130, to transition between the locked state and the unlocked state.

The unlock actuator 340 has a function of causing the lock mechanism 220 to transition from the locked state to the unlocked state in response to a command from the airbag control unit 300, so as to disable the support 210.

When it is determined, based on the output of the environment recognizer 311, that there is a high possibility that a rear-end collision with a strength equal to or greater than a predetermined strength occurs (when a sign of the rear-end collision is detected), or when an occurrence of a rear-end collision with a strength equal to or greater than the predetermined strength is detected based on the output of the collision sensor 310, the airbag control unit 300 gives a command to the unlock actuator 340 to cause the lock mechanism 220 to transition to the unlocked state.

According to the second embodiment described above, the unlock actuator 340 disables the support 210 in accordance with the outputs of the collision sensor 310 and the environment recognizer 311. Therefore, fine control can be performed in accordance with a mode and strength of a collision that has actually occurred or is predicted to occur.

Third Embodiment

Next, a vehicle seat according to a third embodiment of the disclosure will be described.

The vehicle seat according to the third embodiment includes a seat surface lowering mechanism 400 which will be described below, instead of the seat surface lowering mechanism 200 described above.

Figure 6:
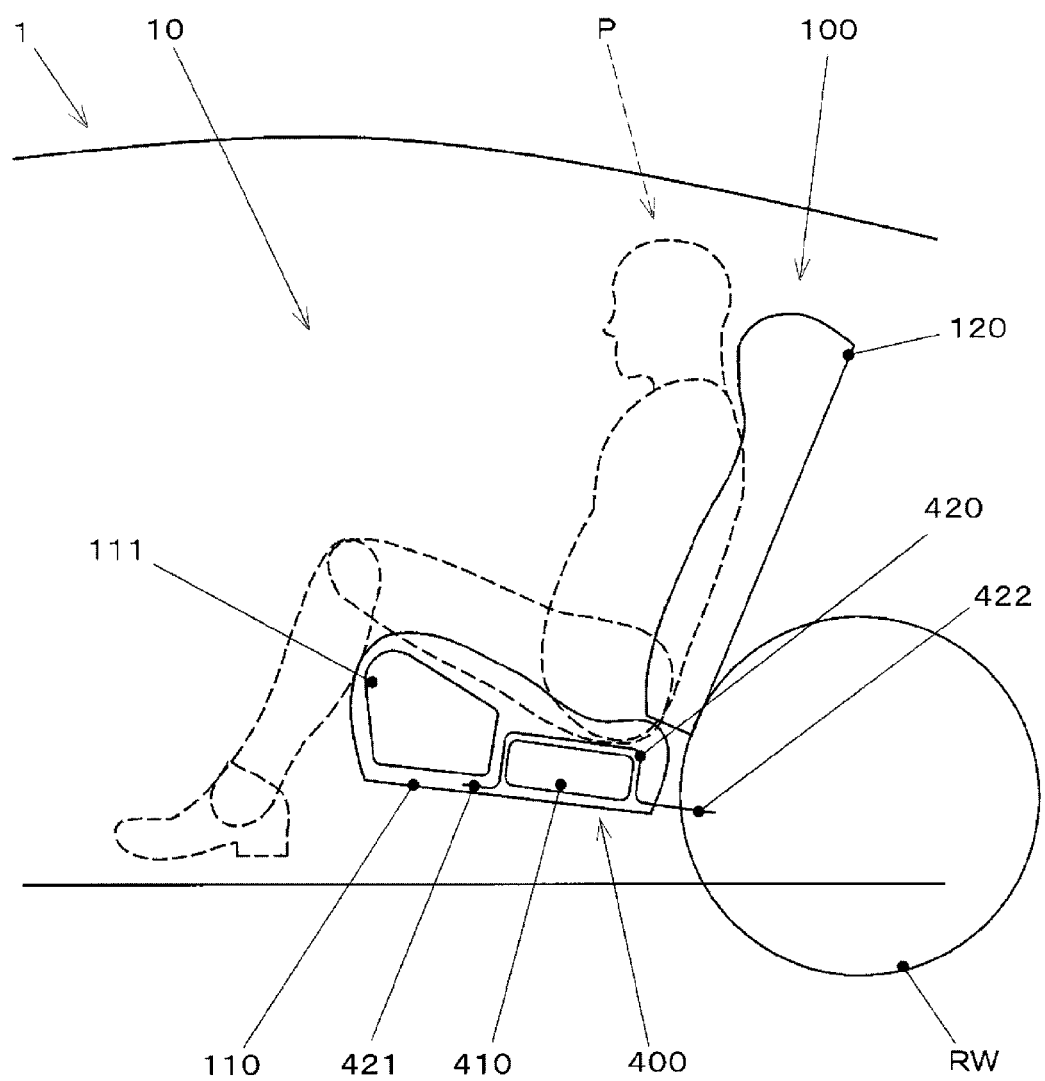
FIG. 6 is a view illustrating a configuration of a vehicle body rear portion of a vehicle having a vehicle seat according to an embodiment of the disclosure, before a collision.

FIG. 6 is a view illustrating a configuration of a vehicle body rear portion of a vehicle having the vehicle seat according to the third embodiment, before a collision.

The seat surface lowering mechanism 400 includes a rear cushion 410, a webbing 420, and the like.

The rear cushion 410 is provided inside the seat cushion 110 below the rear half of the seat surface on which the waist of the occupant P is to be placed.

The rear cushion 410 is an elastic body made of a porous body such as urethane foam.

A front cushion 111 is provided inside the seat cushion 110 below the front half of the seat surface on which the thighs of the occupant P are to be placed.

The webbing 420 is a belt-shaped member having flexibility, and is wound around the rear cushion 410 so as to sequentially come into contact with a front surface, an upper surface, and a rear surface of the rear cushion 410.

A front portion 421 of the webbing 420 is fixed to the seat frame (not illustrated) or the like in the vicinity of a lower end of the front surface of the rear cushion 410.

A rear portion 422 of the webbing 420 is coupled to a pulling device (not illustrated).

The webbing 420 presses the elastic body of the rear cushion 410 in the up-down direction when being pulled by the pulling device. In one embodiment, the webbing 420 may serve as an "elastic body pressing unit".

For example, the pulling device may be provided in place of the unlock actuator 340 of the collision damage reduction system of the second embodiment.

The pulling device pulls the rear portion of the webbing 420 to apply a tension to the webbing 420 in response to a detection of either one of an occurrence of a rear-end collision and a sign of the occurrence of the rear-end collision.

For example, the pulling device may be a device that operates in conjunction with the seatbelt pretensioner.

For example, the pulling device may include a bobbin on which a rear end of the webbing 420 is wound. A rotation shaft of the bobbin of the pulling device may be common to a rotation shaft of the bobbin of the seatbelt pretensioner that pulls the seatbelt. With this configuration, the webbing 420 is pulled at the same time when the seatbelt pretensioner is operated to pull the seatbelt.

Figure 7:
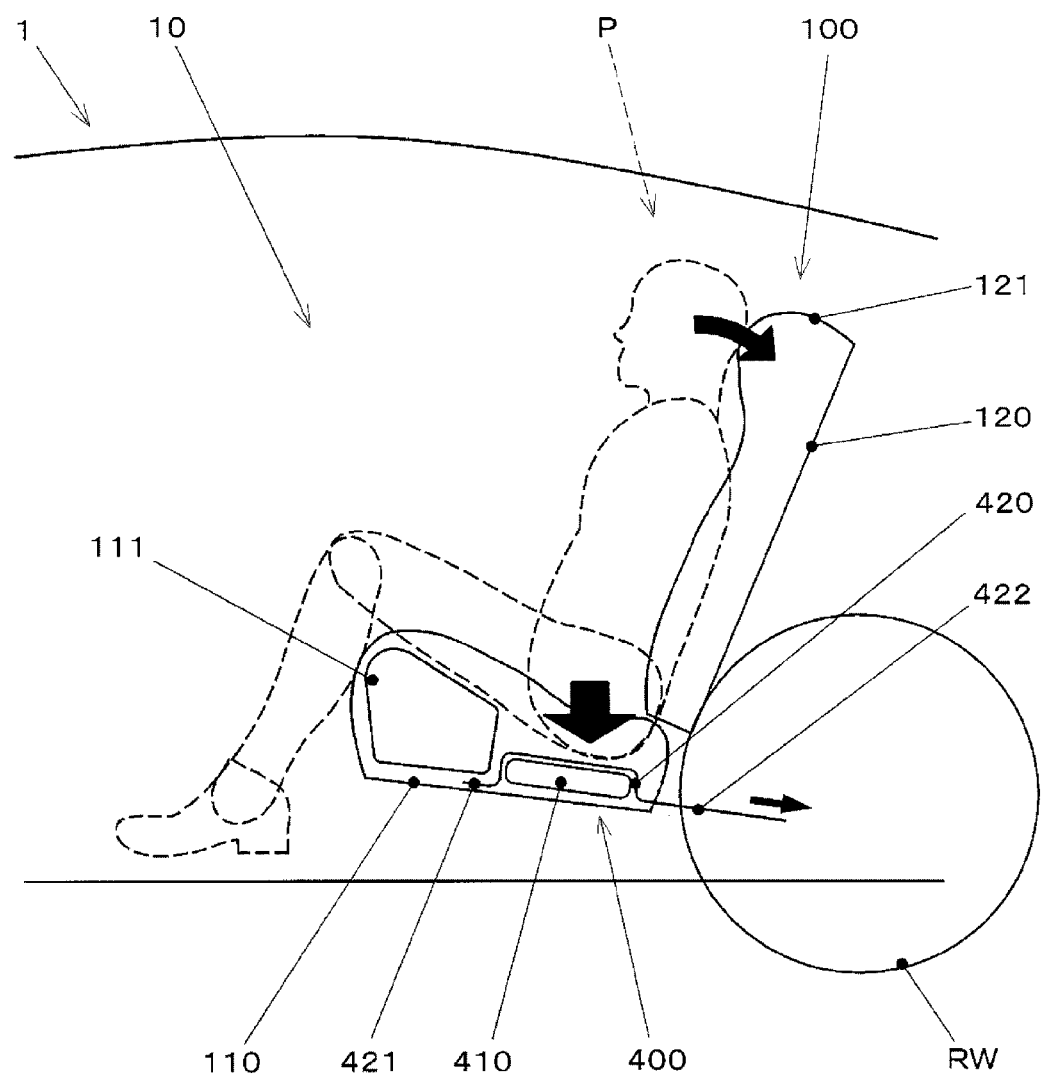
FIG. 7 is a view illustrating the configuration of the vehicle body rear portion of the vehicle according to the embodiment, after a rear-end collision.

FIG. 7 is a view illustrating the configuration of the vehicle body rear portion of the vehicle according to the third embodiment, after a rear-end collision.

When the pulling device pulls the webbing 420, the rear cushion 410 is pressed such that the upper surface of the rear cushion 410 approaches the lower surface of the rear cushion 410.

As a result, the rear portion of the seat surface of the seat cushion 110 is lowered.

In the third embodiment, the mechanism that lowers the seat surface of the seat cushion may include a soft member such as a cushion made of an elastic body or a webbing having flexibility. Therefore, the occupant can be prevented from feeling uncomfortable, a foreign object or discomfort, and occupant protection performance during the rear-end collision can be improved.

Fourth Embodiment

Next, a vehicle seat according to a fourth embodiment of the disclosure will be described.

In the vehicle seat according to the fourth embodiment, a path along which the webbing 420 of the seat surface lowering mechanism 400 is wound around the rear cushion 410 is partially modified from that of the third embodiment.

Figure 8:
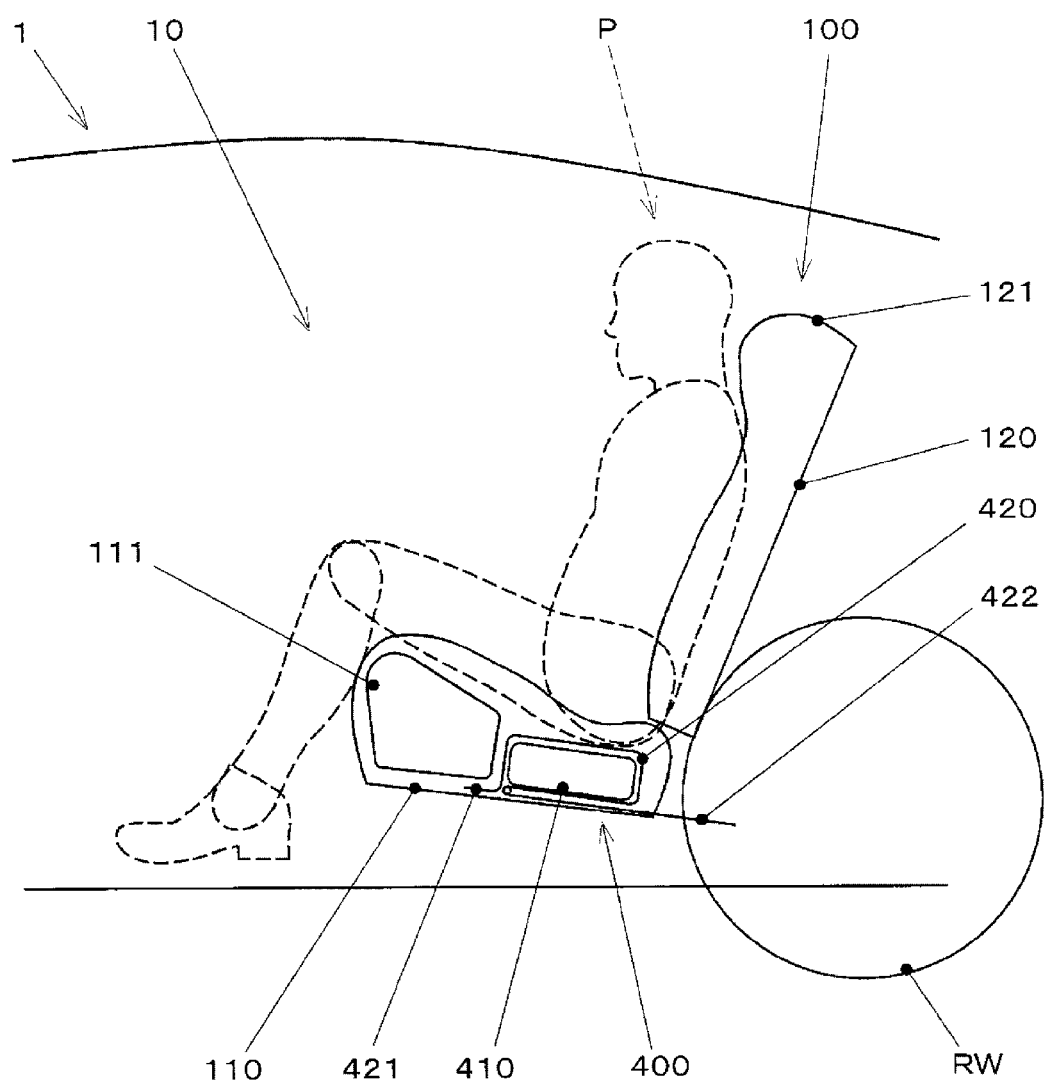
FIG. 8 is a view illustrating a configuration of a vehicle body rear portion of a vehicle having a vehicle seat according to an embodiment of the disclosure, before a collision.

FIG. 8 is a view illustrating a configuration of a vehicle body rear portion of a vehicle having the vehicle seat according to the fourth embodiment of the disclosure, before a collision.

In the fourth embodiment, an intermediate portion of the webbing 420 is sequentially wound along the front surface, the upper surface, and the rear surface of the rear cushion 410, then passes below the rear cushion 410, is folded back below a front end of the rear cushion 410, and then is pulled out toward the vehicle rear side and coupled to the pulling device.

A folded portion of the webbing 420 is fixed to the seat frame.

Figure 9:
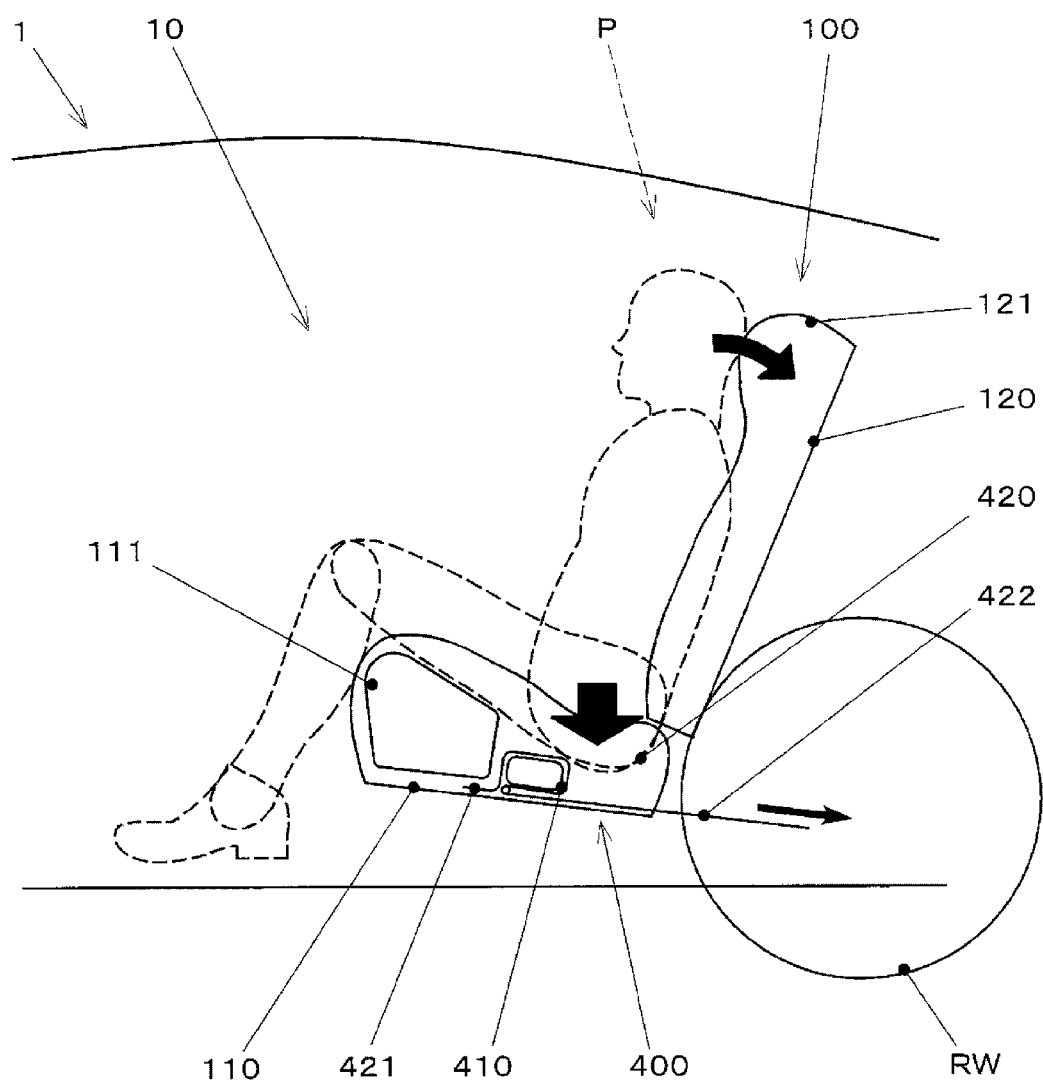
FIG. 9 is a view illustrating the configuration of the vehicle body rear portion of the vehicle according to the embodiment, after a rear-end collision.

FIG. 9 is a view illustrating the configuration of the vehicle body rear portion of the vehicle according to the fourth embodiment, after a rear-end collision.

In the fourth embodiment, the rear cushion 410 is compressed in the front-rear direction, in addition to the rear cushion 410 being compressed in the up-down direction as in the third embodiment.

As a result, a rear end of the rear cushion 410 advances to form a space behind the compressed rear cushion 410.

According to the fourth embodiment, in addition to effects similar to the effects of the third embodiment described above, the seat surface and the waist of the occupant P are lowered to the space formed behind the rear cushion 410, so that the stroke by which the upper body of the occupant P is lowered can be increased, and the effects of the disclosure can be promoted.

Fifth Embodiment

Next, a vehicle seat according to a fifth embodiment of the disclosure will be described.

Figure 10:
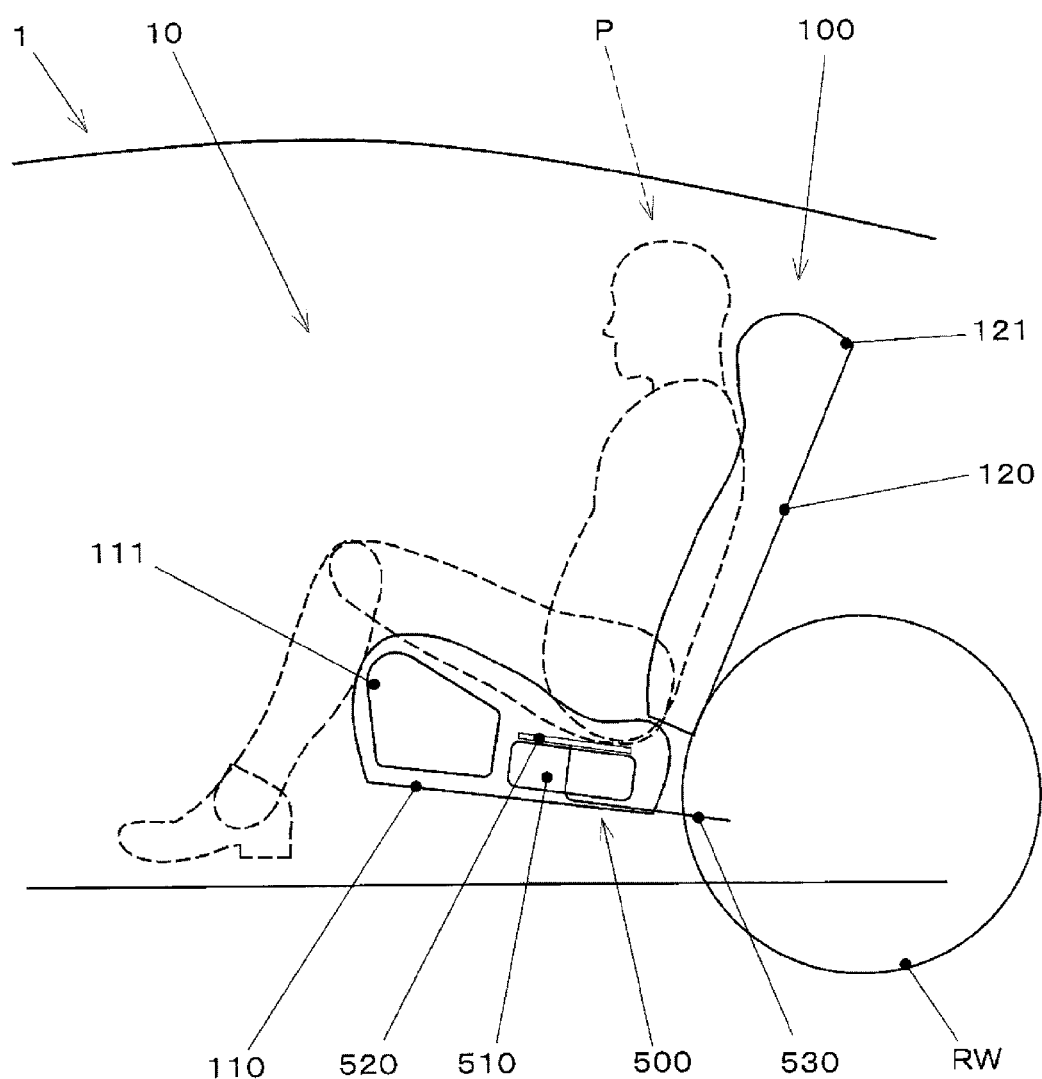
FIG. 10 is a view illustrating a configuration of a vehicle body rear portion of a vehicle having a vehicle seat according to an embodiment of the disclosure, before a collision.

FIG. 10 is a view illustrating a configuration of a vehicle body rear portion of a vehicle according to the fifth embodiment, before a collision.

The vehicle seat according to the fifth embodiment includes a seat surface lowering mechanism 500 which will be described below, instead of the seat surface lowering mechanism 400 of the third embodiment.

The seat surface lowering mechanism 500 includes a rear cushion 510, a compression plate 520, a webbing 530, and the like.

The rear cushion 510 has an opening in a central portion in a plan view, in addition to the same configuration as the rear cushion 410 of the third embodiment. The webbing 530 is inserted through the opening.

The compression plate 520 is a plate-shaped member formed of a harder material (such as metal or hard resin) than that of the rear cushion 510.

The compression plate 520 covers an upper surface of the rear cushion 510.

The webbing 530 is a belt-shaped member having flexibility. One end of the webbing 530 is coupled to a central portion of a lower surface of the compression plate 520. The webbing 530 is pulled out to a lower surface side of the rear cushion 510 via the opening of the rear cushion 510.

The other end of the webbing 530 is pulled out toward the vehicle rear side through below the rear cushion 510, and is coupled to a pulling device (not illustrated) similar to that of the third embodiment.

In one embodiment, the compression plate 520 and the webbing 530 may serve as an "elastic body pressing unit" in cooperation with the pulling device.

Figure 11:
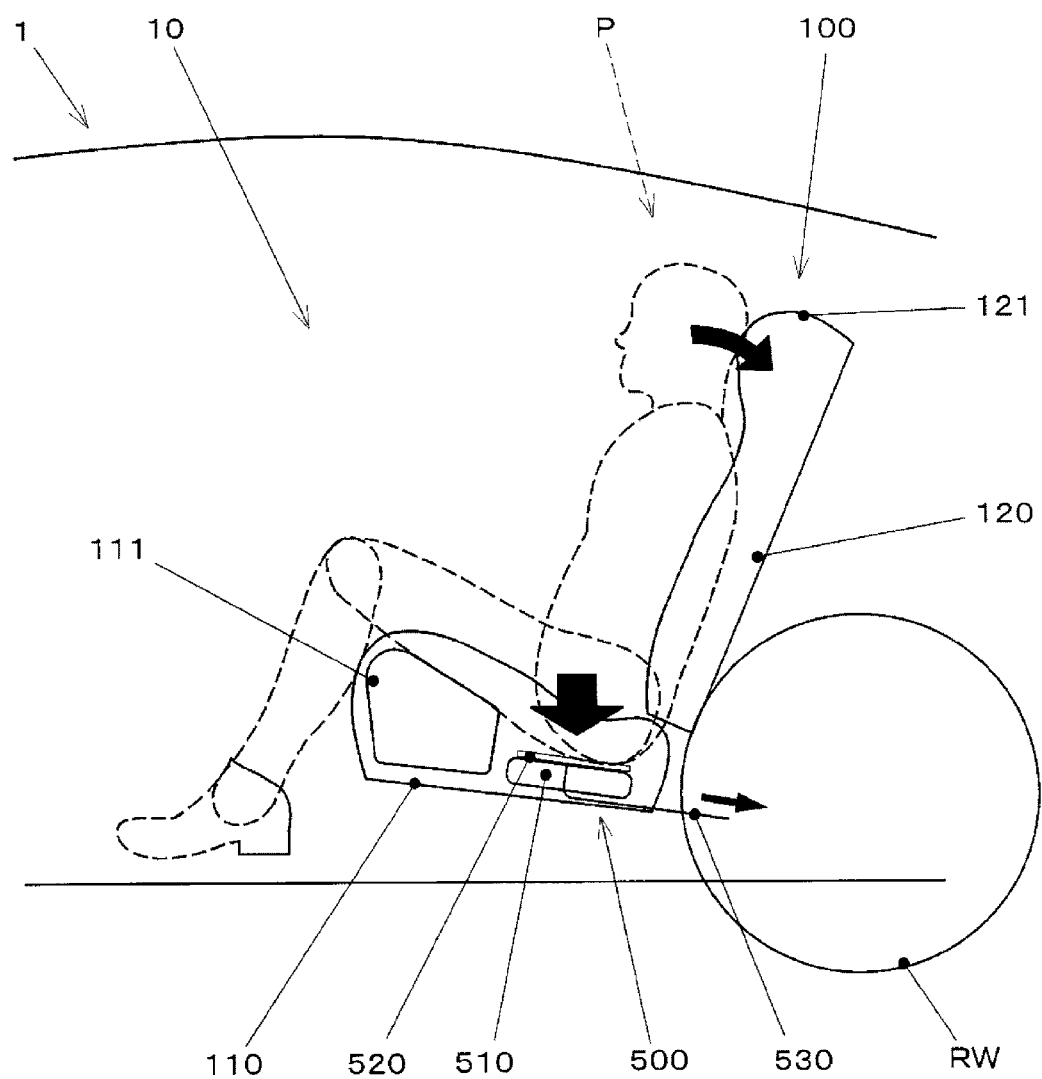
FIG. 11 is a view illustrating the configuration of the vehicle body rear portion of the vehicle according to the embodiment, after a rear-end collision.

FIG. 11 is a view illustrating the configuration of the vehicle body rear portion of the vehicle according to the fifth embodiment, after a rear-end collision.

When the pulling device pulls the webbing 530 in response to either one of an occurrence of a rear-end collision and a sign of the occurrence of the rear-end collision, the compression plate 520 is pulled down by the webbing 530, and the rear cushion 510 is compressed in the up-down direction.

As a result, the seat surface of the seat cushion 110 and the waist of the occupant P are lowered, and the occupant injury during the rear-end collision can be reduced as in the other embodiments.

MODIFICATIONS

The disclosure is not limited to the embodiments described above. Various modifications and changes may be made and also fall within the technical scope of the disclosure.

(1) The configurations of the vehicle seat and the vehicle are not limited to the embodiments described above, and may be changed as appropriate.

For example, the configuration of the seat surface lowering mechanism which lowers the seat surface of the seat cushion is not limited to that of each embodiment, and may be changed as appropriate.

(2) The vehicle seat of each embodiment is, for example, a second-row seat of a passenger vehicle. The disclosure is also applicable to a first-row seat and a third-row or subsequent row seat. In addition, the vehicle is not limited to a passenger vehicle, and may be another type of vehicle.

(3) In the third to fifth embodiments, the webbing is provided in addition to the seatbelt pretensioner, and is pulled by the bobbin that operates in conjunction with the seatbelt pretensioner. The disclosure is not limited thereto. A tension may be applied to the webbing by an actuator independent of the seatbelt.

A vehicle seat of the disclosure includes a seat cushion and a seat surface lowering mechanism. The seat cushion includes a seat surface on which a waist of an occupant is to be placed. The seat surface lowering mechanism is configured to lower the seat surface in response to either one of an occurrence of a rear-end collision and a sign of the occurrence of the rear-end collision.

Accordingly, the seat surface is lowered in response to either one of the occurrence of the rear-end collision and the sign of the occurrence of the rear-end collision. Therefore, the waist (including the pelvis) of the occupant is sunk into the seat cushion to absorb the impact acting on the occupant due to the rear-end collision, the upper body of the occupant is prevented from rising along an inclined surface of the seat back, and the head of the occupant can be appropriately received by the headrest, so that so-called whiplash injury can be reduced.

The seat surface lowering mechanism may include a support and a support disabling unit. The support is configured to support the seat surface. The support disabling unit is configured to disable the support in accordance with an acceleration equal to or higher than a predetermined acceleration.

With this configuration, by disabling the support in response to an acceleration, the above effects can be obtained with a simple configuration.

For example, the disclosure can be simply and inexpensively implemented by a mechanical configuration that does not use electrical control.

The vehicle seat may further include a rear-end collision detector configured to detect either one of the occurrence of the rear-end collision and the sign of the occurrence of the rear-end collision. The seat surface lowering mechanism may include a support and a support disabling unit. The support is configured to support the seat surface. The support disabling unit is configured to disable the support in accordance with an output of the rear-end collision detector.

With this configuration, by disabling the support in accordance with the output of the rear-end collision detector, fine control can be performed in accordance with a mode and strength of a collision that has actually occurred or is predicted to occur.

The vehicle seat may further include a rear-end collision detector configured to detect either one of the occurrence of the rear-end collision and the sign of the occurrence of the rear-end collision. The seat cushion may include an elastic body disposed below the seat surface. The seat surface lowering mechanism may include an elastic body pressing unit configured to press the elastic body in an up-down direction in accordance with an output of the rear-end collision detector.

With this configuration, in a normal state (before the occurrence of the collision), the elastic body is present below the seat surface, so that the occupant can be prevented from feeling uncomfortable and a foreign object on the buttocks, and riding comfort can be improved.

The vehicle seat may further include a seatbelt pretensioner configured to apply a tension to a seatbelt configured to restrain the occupant. The elastic body pressing unit may press the elastic body by a flexible member to which a tension is applied in conjunction with an operation of the seatbelt pretensioner.

With this configuration, it is not necessary to provide a dedicated actuator for the seat surface lowering mechanism, a control device thereof, and the like, and the device configuration can be simplified.

As described above, according to the disclosure, it is possible to provide the vehicle seat that prevents an occupant injury during a rear-end collision.

The invention claimed is:

1. A vehicle seat to be mounted on a vehicle, the vehicle seat comprising:
   a seat cushion including a seat surface on which a waist of an occupant of the vehicle is to be placed; and
   a seat surface lowering mechanism configured to lower the seat surface in response to an occurrence of a rear-end collision of the vehicle,
   wherein the seat surface lowering mechanism includes:
      a support configured to support the seat surface;
      a traveling member;
      a guiding member configured to guide the traveling member to travel along a front-rear direction of the vehicle; and
      an unlock trigger provided in a traveling range of the traveling member and rearward of the traveling member, and
   wherein the unlock trigger is configured to disable the support in response to the traveling member colliding with the unlock trigger at an acceleration greater than or equal to a predetermined value.

2. A vehicle seat to be mounted on a vehicle, the vehicle seat comprising:
   a seat cushion including a seat surface on which a waist of an occupant of the vehicle is to be placed;
   a seat surface lowering mechanism configured to lower the seat surface in response to either one of:
      an occurrence of a rear-end collision of the vehicle; or
      a sign of the occurrence of the rear-end collision;
   a rear-end collision detector configured to detect either one of:
      the occurrence of the rear-end collision; or
      the sign of the occurrence of the rear-end collision,
   wherein the seat cushion includes an elastic body made of urethane foam inside, the elastic body being disposed below the seat surface, and
   wherein the seat surface lowering mechanism comprises an elastic body pressing unit including a flexible member surroundingly engaging the elastic body and configured to press the elastic body in an up-down direction in accordance with an output of the rear-end collision detector.

3. The vehicle seat according to claim 2, further comprising a seatbelt pretensioner configured to apply a tension to a seatbelt provided in the vehicle, the seatbelt being configured to restrain the occupant,
   wherein the elastic body pressing unit presses the elastic body by the flexible member to which a tension is to be applied in conjunction with an operation of the seatbelt pretensioner.

4. The vehicle seat according to claim 3, wherein the elastic body pressing unit is further configured to press the elastic body in a front-rear direction in accordance with the output of the rear-end collision detector to advance a rear end of the elastic body.

5. A vehicle seat to be mounted on a vehicle, the vehicle seat comprising:
   a seat cushion including a seat surface on which a waist of an occupant of the vehicle is to be placed; and
   a seat surface lowering mechanism configured to lower the seat surface in response to an occurrence of a rear-end collision of the vehicle,
   wherein the seat surface lowering mechanism includes:
      a support configured to support the seat surface;
      a traveling member;
      a holder i) configured to hold the traveling member when an acceleration of the vehicle is less than a first predetermined value and ii) configured to release the traveling member when the acceleration of the vehicle is greater than or equal to the first predetermined value;
      a guiding member configured to guide the traveling member released from the holder to travel freely along a front-rear direction of the vehicle; and
      an unlock trigger i) provided in a traveling range of the traveling member guided by the guiding member and ii) provided rearward and apart from the traveling member is held by the holder, and
   wherein the unlock trigger is configured to disable the support in response to the traveling member colliding with the unlock trigger at an acceleration greater than or equal to a second predetermined value.

* * * * *